July 15, 1941.  F. W. SCHMIDT  2,249,050
VEHICLE JACKING STRUCTURE
Filed Feb. 6, 1936  2 Sheets-Sheet 1

Inventor
Frank W. Schmidt
By Beaman & Langford
Attorney

July 15, 1941.  F. W. SCHMIDT  2,249,050
VEHICLE JACKING STRUCTURE
Filed Feb. 6, 1936  2 Sheets-Sheet 2

Inventor
Frank W. Schmidt
By Beaman & Langford
Attorney

Patented July 15, 1941

2,249,050

UNITED STATES PATENT OFFICE 2,249,050

VEHICLE JACKING STRUCTURE

Frank W. Schmidt, Jackson, Mich., assignor to Ryerson & Haynes, Inc., Jackson, Mich., a corporation of Michigan Application February 6, 1936, Serial No. 62,574

4 Claims. (Cl. 254—108)

This invention relates to vehicle jacking structures and particularly to the type commonly known as bumper jacks which engage with the bumper structure of a vehicle for lifting the sprung portion of the vehicle.

The particular novelty in the present invention resides in details of construction resulting in a strong, efficient, yet inexpensively constructible construction embodying not only the load supporting members but also the actuating mechanism.

An object of this invention is to provide actuating mechanism including a spring for controlling the lifting pawl, and holding detent which is pivoted to the holding detent at one end and is connected with a lost motion connection at the other end to the lifting pawl.

Another object of this invention is to provide a novel vehicle supporting portion.

A further object of the invention is to provide a novel body for carrying the vehicle supporting portion.

A still further object of the invention is to provide a novel base for receiving the load supporting column.

Figures 1, 3:
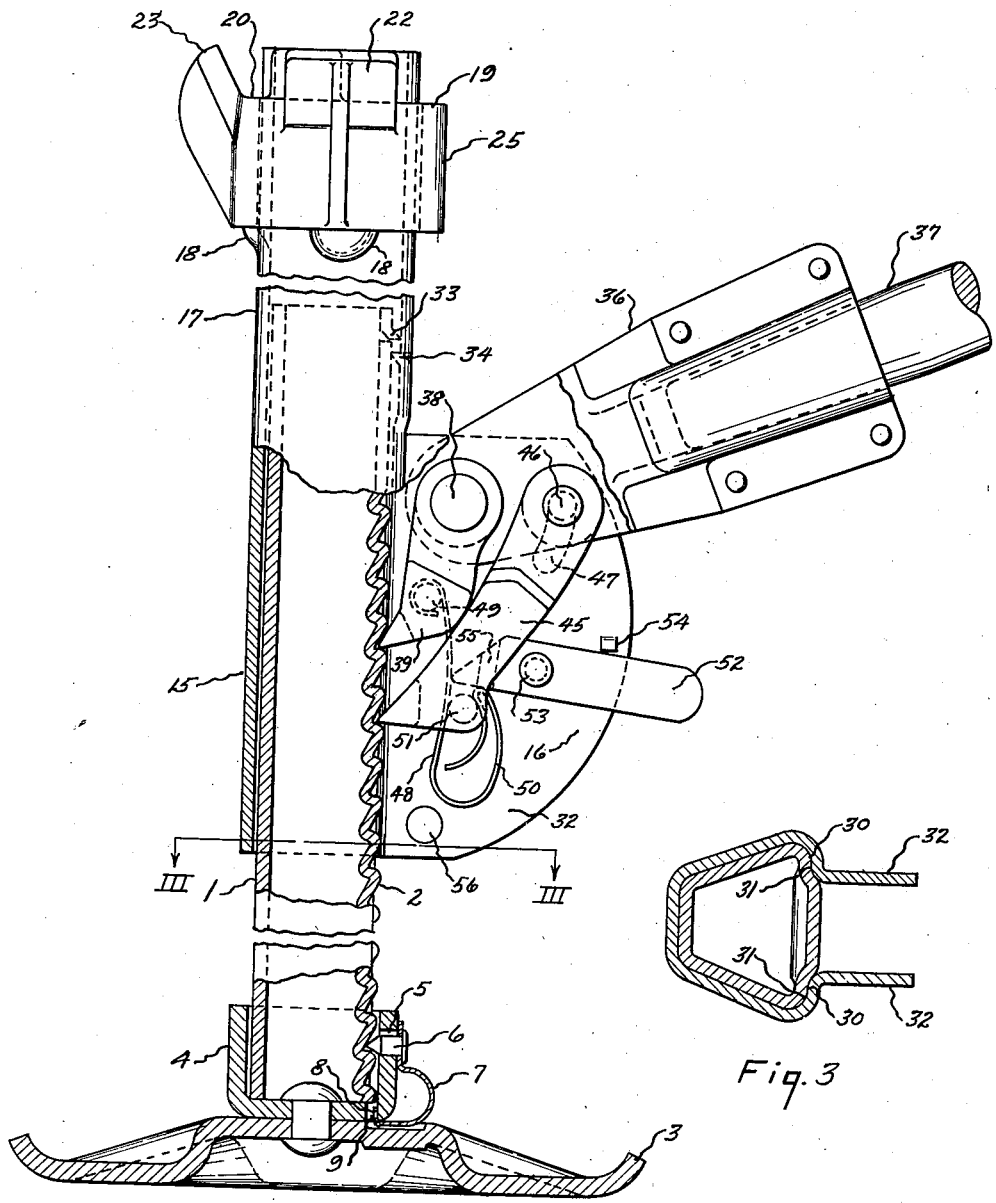
Figure 5:
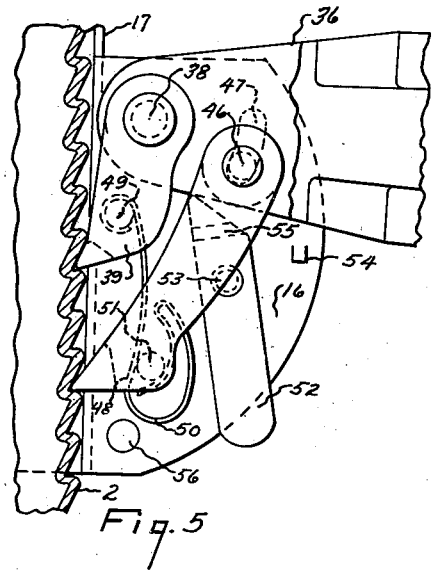
Figure 4:
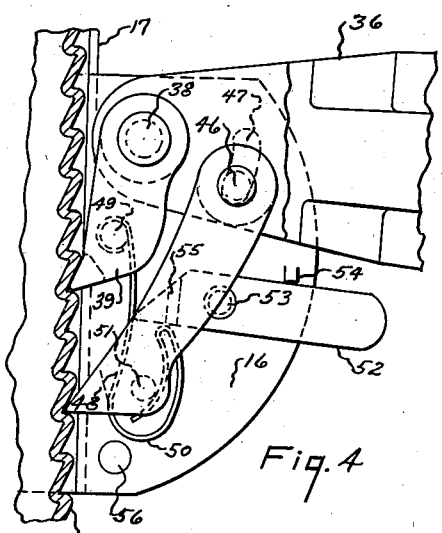
Figure 6:
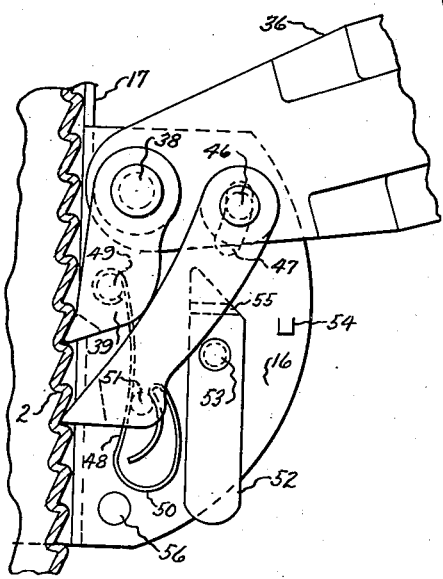
Figure 2:
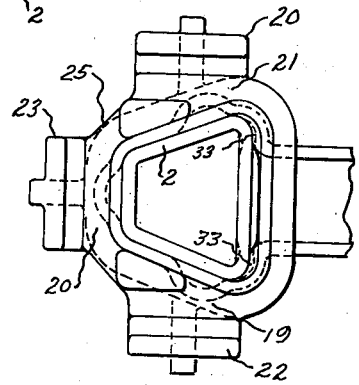

These and other objects relating to the details of the construction will be apparent from the following specification when taken with the accompanying drawings in which:

Fig. 1 is a side view partly in section disclosing the completely assembled jack, Fig. 2 is a plan view showing particularly the vehicle supporting portion, Fig. 3 is a cross section on the line III—III of Fig. 1, Fig. 4 is a vertical section showing the actuating mechanism in lifting position, and Figs. 5 and 6 are vertical sections showing the actuating mechanism in different lowering positions.

Referring particularly to Fig. 1 of the drawings the jack comprises a hollow sheet metal rack bar or supporting column more particularly disclosed in my copending application Serial No. 27,851, filed June 22, 1935, patented May 19, 1936, as Patent No. 2,041,376, having a trapezoidal cross section as disclosed in Fig. 2 and teeth 2 on the longer parallel side. As is set forth in said copending application, the converging sides of the supporting column 1 make possible a column of greater strength using less material than conventional shapes and also provide an increased bearing surface over which the thrust opposing that exerted by the actuating pawls is distributed.

The supporting column 1 is provided with a base 3 to which is riveted a receiving cup 4 having an internal configuration corresponding generally to the external configuration of the supporting column 1. In order to yieldingly maintain the supporting column 1 in the receiving cup 4 the latter is provided with an opening 5 through which extends a tapered pin 6 yieldingly urged inwardly by a flat spring 7 secured in a suitable manner to the base 3. As shown the spring 7 is provided with an upturned end 8 fitted in a second recess 9 in the receiving cup 4 and is clamped against the base 3 by the receiving cup 4. The resiliently urged pin 6 is arranged to coact with the ratchet teeth 2 and thus yieldingly maintain the supporting column in the receiving cup 4.

Slidably mounted on the supporting column 1 is a body 15 reversely bent from a sheet metal plate as disclosed particularly in Fig. 3 to provide on one side of the supporting column 1 a housing 16 for the actuating mechanism. The body 15 is provided with a vertical split tubular extension 17 forming a member concentric with the supporting column 1. The extension 17 is provided with a plurality of struck out tabs 18 on which rests a cast trapezoidal ring having bar receiving ledges 19, 20 and 21.

The ledges 19, 20 and 21 are respectively provided with inclined retaining sides 22, 23 and 24 each of which is suitably backed up or reinforced. The ledges 19, 20 and 21 together with the retaining sides 22, 23 and 24 constitute a vehicle supporting portion or rest 25 of the jack. The reason for the particular form of the vehicle receiving portion 25 is to permit its engagement with the bumper bar of the vehicle on any one of the three ledges and also to permit the engagement with two adjacent bars when the bumper structure is so designed. In the later case the opposed ledges 19 and 21 are the ones which are used; the supporting column extending between the adjacent bars. Also the supporting portion 25 comprises a ferrule for reinforcing the split tube 17.

The body 15 as disclosed particularly in Fig. 3 has each side thereof jogged inwardly to provide bearing surfaces 30 for slidably engaging the relatively smooth strips 31 presented by the longer parallel side of the supporting column 1 from which extend the ratchet teeth 2. Substantially parallel plates 32 extend outwardly from the jogged bearing surfaces 30 to provide the housing 16 in which is received the mechanism for actuating the body 15 along the supporting column 1. It will be observed that the body 15, including the bearing surfaces 30 defines a slideway having a configuration conforming to that of the trapezoidal supporting column 1 and for receiving the same. It should be noted that the telescopic extension 17 of the body 15 must be large enough to slide over the teeth 2 and being itself trapezoidal in cross-section does not come into contact with the strips 31 as do the bearing surfaces 30.

In order to limit the movement of the body 15 and the vertical extension 17, relatively to the supporting column 1, there are provided stops. Thus, on the supporting column 1 at the upper end thereof there are struck out from the strips 31, stops 33. Corresponding stops 34 are struck inwardly from the extension 17 in the path of the stops 33. The stops 34 are positioned near the lower end of the extension 17 so that when the body 15 and the extension 17 are in their extreme upper position, a greater portion of the extension 17, including the vehicle supporting portion 25, projects beyond the top of the supporting column 1. In this manner the effective height of the jack is materially increased or in other words the height of the supporting column 1 may be reduced from the height that would be normally required were not the extension 17 provided.

The mechanism within the housing 16 for actuating the body 15 and consequently the vehicle supporting portion 25, along the supporting column 1 is operated by an actuating lever 36 of usual form provided with a socket for receiving an extension handle 37. The lever 36 is pivoted between the plates 32 by a pin 38 supported by the plates 32. Also pivoted about the pin 38 is a holding detent 39. A lifting pawl 45 is pivoted to the lever 36 by a pin 46. Motion of the pawl 45 and consequently the lever 36 is limited by the arcuate slot 47 in the plates 32 which receive extensions of the pin 46 of reduced diameter. An operative connection between the holding detent 39 and the lifting pawl 45 is provided in the form of a flat elongated spring 48. One end of the spring 48 is pivoted about a pin 49 secured to one side of the detent 39. The other end of the spring 48 is in the form of a restricted loop 50 in which is disposed a pin 51 secured to one side of the pawl 45 thus providing with the pawl 45 a lost motion connection. The loop 50 is formed by reverse bending an end of the spring 48 to form a hook and then reverse bending the bent end and curving the same toward the shank so that the restricted slot is defined by the reversely bent curved end and the shank.

The operating mechanism is provided with a reversing lever 52 pivoted by the pin 53 to the side plates 32. The inner end of the lever 52 is so arranged that when the outer end of the lever 52 is raised against its stop 54 struck out from one of the plates 32, it engages the spring 48 to urge the same toward the supporting column 1. In such position the holding detent 39 and the lifting pawl are both urged against the teeth 2 and the mechanism is set for lifting the body and vehicle supporting portion 25. The inner end of the lever 52 is provided with an offset portion 55 to permit upward movement of the spring 48 while the reversing lever 52 is in raised position, namely, that shown in Fig. 1. A rivet 56 is provided to maintain the lower portions of the plates 32 in a predetermined spaced relation.

The operation of the jack is as follows: The jack supporting portion 25 is bodily raised carrying with it, of course, the extension 17 and body portion 15, until it comes in contact with one or two of the parts of the bumper structure. The outer end of the lever 52 is then moved upwardly to urge its inner end against the spring 48. In this position, the holding detent 39 and the lifting pawl 45 being yieldingly urged by the spring against the teeth 2 of the supporting column 1, a pumping movement of the lever 36 results in the lifting pawl 45 urging the vehicle supporting portion 25 upwardly step by step in a known manner, the holding detent 39 acting to prevent downward movement of the vehicle supporting portion 25 while the lifting pawl 45 is moving upwardly into the next higher tooth. The limitation of movement of the lever 36 is defined by the slots 47.

When it is desired to lower the vehicle supporting portion 25 the outer end of the reversing lever 52 is moved downwardly until the inner end thereof is moved from contact with the spring 48. The actuating lever 36 is then moved downwardly until at a position just before reaching the bottom of its stroke as disclosed in Fig. 5 the pin 51 on the lifting pawl 45 engages with the lower portion of the loop 50. As the weight of the vehicle on the vehicle supporting portion 25 is supported by the lifting pawl 45 the holding detent 39 is pulled away from the teeth 2 on the completion of the downward stroke of the lever 39. Then as the lever 39 is moved upwardly the holding detent 39 passes downwardly over one of the teeth 2 until the upper end of the loop 50, as disclosed in Fig. 6, moves into engagement with the pin 51 on the lifting pawl 45, at which time there is a relative upward thrust on the spring 48 which forces the holding detent 39 into engagement with the next lower tooth 2. Continuing upward movement of the lever 36 results in further upward thrust on the spring 48 causing it to pivot in a counterclockwise direction as disclosed in Fig. 5 and consequently draw the lifting pawl 45 out of engagement with one of the teeth 2. It is to be understood that during the raising of the lever 36 immediately after the detent 39 is moved into engagement with one of the teeth 2, the weight of the vehicle on the jack supporting portion 25 is transferred from the lifting pawl 45 to the holding detent 39. When the lever 36 is moved downwardly the lifting pawl 45 moves toward the supporting column 1 and into engagement with the next lower tooth 2 and the operation is repeated to lower the vehicle in a step by step movement.

It should be observed that the operation of the jack may be facilitated by initially not raising the jack supporting portion through pumping of the lever 36 but merely by lifting the same until it comes into engagement with one or two of the bumper structure bars, the detent 39 and the lifting pawl 45 sliding over the teeth 2 during such movement. Another feature of the construction is that after the vehicle supporting portion 25 has been lowered by operation of the actuating lever 36 until it is free from the bumper structure, the body 15 carrying the actuating mechanism, the extension 17 and the vehicle supporting portion 25, may be moved downwardly as far as desired by a single movement by merely holding the actuating lever 36 slightly above its horizontal position and in this position bodily raising the body 15 and its associated parts slightly to permit the detent 39 and the pawl 45 to drop away due to the action of gravity from the teeth 2. Then as long as the angular position of the actuating lever 36 remains unchanged neither the detent 39 nor the pawl 45 will engage with the teeth 2 in the supporting column 1 and the body 15 and its associated structure may be lowered to whatever position the supporting column 1 is desired.

Having thus described my invention what I desire to secure by Letters Patent and claim is:

1. A vehicle jack comprising a supporting column, lifting mechanism associated with said column, a base for said column, a tubular socket on said base for telescopically receiving said column, said column having a recess adjacent the bottom thereof in the portion within said socket, said socket having an opening in the side thereof opposite said recess, a pin projecting through said oepning into said recess for locking said column in said socket, and a resilient clip bearing against said base supporting said pin and holding the same in said opening and recess, said socket having a shoulder for receiving a portion of said clip for anchoring the same and stressing said clip to hold said pin in said hole and recess.

2. A vehicle jack comprising a toothed column, a member mounted on said column for slidable movement relative thereto, and a mechanism to actuate said member along said column, said mechanism comprising an actuating lever pivoted to said member, a holding detent pivoted to said member, a lifting pawl, a pin supported by said lever pivoting said lifting pawl to said lever, said pin having an extension, a slot in said member associated with said pin extension, said slot and projection limiting the pivotal movement between said lever and said member, and means operatively associated with said lifting pawl and detent to control their operation during operation of said lever.

3. A vehicle jack comprising a toothed column, a member mounted on said column for slidable movement relative thereto, said member having a pair of laterally extending spaced ears and mechanism to actuate said member along said column, said mechanism being disposed between said ears and comprising an actuating lever pivoted between and to said ears, a holding detent pivoted to said member, a lifting pawl, a pin projecting through said lever and pivotally supporting said pawl from said lever, said pin having an axial extension at least at one end thereof, one of said ears having a slot therein opposite said pin extension, said extension projecting through said slot for limiting the pivotal movement between said lever and said member, and means operatively associated with said lifting pawl and detent to control their operation during operation of said lever.

4. A vehicle jack comprising a toothed column, a member mounted on said column for slidable movement relative thereto, and a mechanism to actuate said member along said column, said mechanism comprising an actuating lever pivoted to said member, a holding detent pivoted to said member, a lifting pawl, a pin supported by said lever pivoting said lifting pawl to said lever, stops on said member in the path of movement of said pin for limiting the pivotal movement between said lever and said member, and means operatively associated with said lifting pawl and detent to control their operation during the operation of said lever.

FRANK W. SCHMIDT.